US007628135B2

(12) United States Patent
Messmer

(10) Patent No.: US 7,628,135 B2
(45) Date of Patent: Dec. 8, 2009

(54) MULTI-PART PISTON FOR AN INTERNAL COMBUSTION ENGINE

(75) Inventor: Dieter Messmer, Remseck (DE)

(73) Assignee: Mahle International GmbH, Stuttgart (DE)

( * ) Notice: Subject to any disclaimer, the term of this patent is extended or adjusted under 35 U.S.C. 154(b) by 16 days.

(21) Appl. No.: 12/086,993

(22) PCT Filed: Dec. 20, 2006

(86) PCT No.: PCT/DE2006/002274

§ 371 (c)(1),
(2), (4) Date: Jul. 10, 2008

(87) PCT Pub. No.: WO2007/076821

PCT Pub. Date: Jul. 12, 2007

(65) Prior Publication Data

US 2009/0007880 A1 Jan. 8, 2009

(30) Foreign Application Priority Data

Dec. 23, 2005 (DE) ...................... 10 2005 061 899

(51) Int. Cl.
*F02F 3/00* (2006.01)
*F16J 1/00* (2006.01)

(52) U.S. Cl. ................................................. 123/193.6

(58) Field of Classification Search .............. 123/103.6, 123/193.6; 92/212
See application file for complete search history.

(56) References Cited

U.S. PATENT DOCUMENTS 1,723,187 A 8/1929 Lemieux
1,723,823 A 8/1929 Teetor
4,709,621 A * 12/1987 Matsui et al. ................. 92/212
5,081,968 A * 1/1992 Bruni ...................... 123/193.6
5,738,061 A 4/1998 Kawamura
5,975,040 A * 11/1999 Silvonen et al. .......... 123/193.6
6,622,613 B1 9/2003 Kortas et al.
6,729,291 B1 * 5/2004 Scharp et al. ............ 123/193.6
6,763,758 B2 7/2004 Kemnitz et al.

FOREIGN PATENT DOCUMENTS

| | | |
|---|---|---|
| DE | 281 030 | 12/1914 |
| DE | 38 30 033 | 6/1989 |
| DE | 41 31 275 | 3/1993 |
| DE | 199 10 582 | 9/2000 |
| DE | 696 06 470 | 9/2000 |
| DE | 102 57 022 | 6/2004 |
| EP | 0 469 666 | 2/1992 |
| EP | 1 483 493 | 12/2004 |
| FR | 1 368 656 | 7/1964 |
| FR | 2 681 643 | 3/1993 |
| JP | 01-318749 | 12/1989 |
| WO | WO 03/076786 | 9/2003 |

* cited by examiner

*Primary Examiner*—Marguerite J. McMahon
(74) *Attorney, Agent, or Firm*—Collard & Roe, P.C.

(57) ABSTRACT

A multipart piston for an internal combustion engine has a top piston part and a bottom piston part. The top piston part is provided with an externally threaded head at the end facing the bottom piston part while the bottom piston part is equipped with a support plate at the end facing the top piston part. The support plate encompasses a plate member and an internally threaded element into which the threaded head is screwed. The plate member is joined to the bottom piston part via a connection zone in such a way that the bottom end of the threaded element lies below the bottom end of the connection zone relative to the longitudinal axis of the piston.

5 Claims, 3 Drawing Sheets

MULTI-PART PISTON FOR AN INTERNAL COMBUSTION ENGINE

CROSS REFERENCE TO RELATED APPLICATIONS

Figure 1:
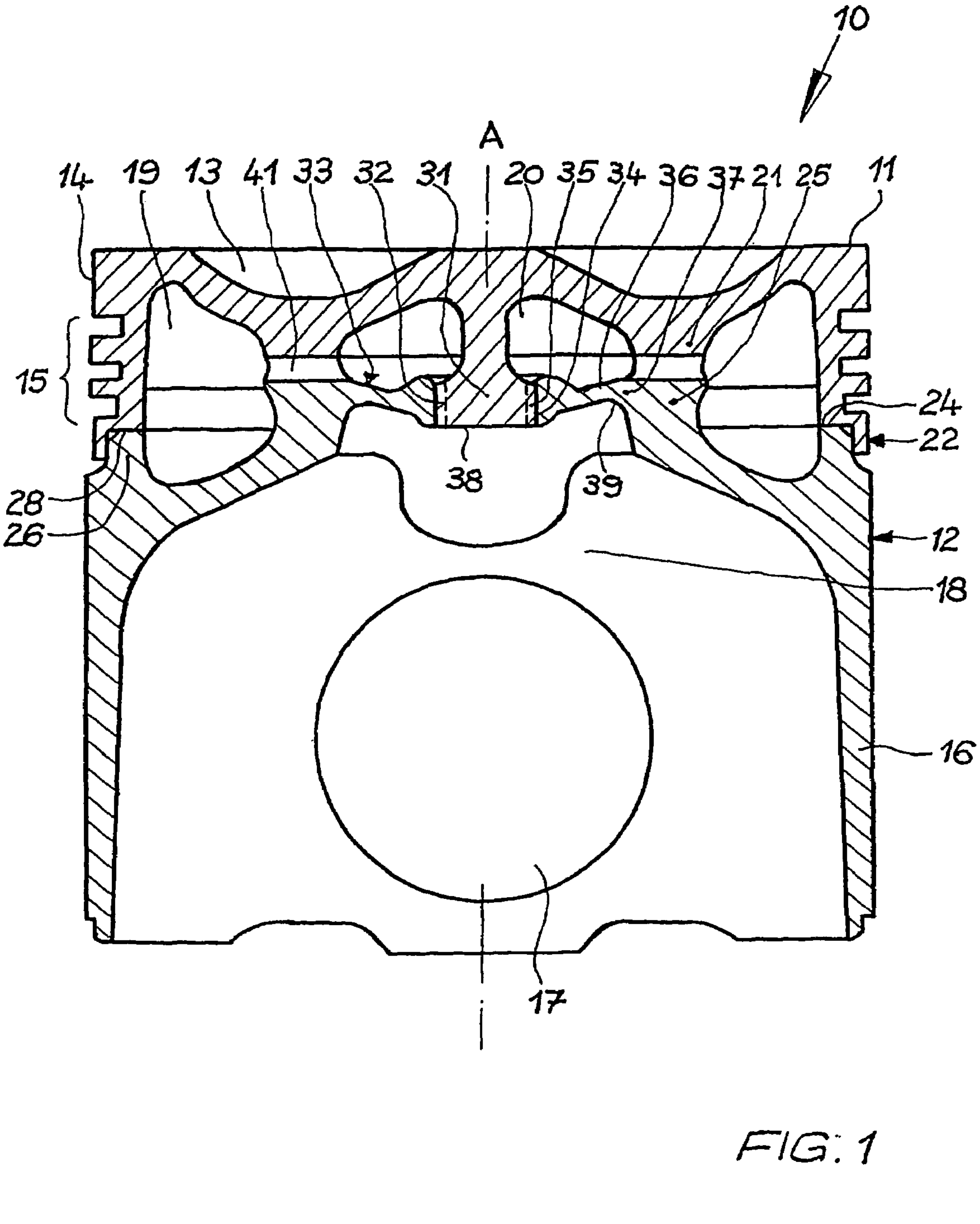

This application is the National Stage of PCT/DE2006/002274 filed on Dec. 20, 2006, which claims priority under 35 U.S.C. §119 of German Application No. 10 2005 061 899.5 filed on Dec. 23, 2005. The international application under PCT article 21(2) was not published in English.

The present invention relates to a multi-part piston for an internal combustion engine, having an upper piston part and a lower piston part, whereby the upper piston part has a threaded head provided with an outside thread on its side facing the lower piston part, and the lower piston part has a support plate with a plate body and a threaded body provided with an inside thread on its side facing the upper piston part, into which the threaded head is screwed.

Multi-part pistons have the great advantage that the upper piston part and the lower piston part can consist of different materials. The upper piston part is generally produced from a particularly wear-resistant material, particularly one that is heat-resistant, but relatively heavy, while the lower piston part is generally produced from a light-metal material that is less wear-resistant, in order to save weight. In this connection, the upper piston part and the lower piston part can be connected with one another by means of being screwed together, as disclosed in EP 1 483 493 B1.

A piston of the type stated is described in DE 102 57 022 A1. It has a threaded head affixed to the upper piston part, and a support plate affixed to the lower piston part, having a threaded body that corresponds to the threaded head, which are screwed to one another during assembly of the piston. In this connection, the support plate provided with the threaded body is domed in the manner of a disk spring, so that a tensile stress is exerted on the threaded head, which stress brings about a permanent assembly connection between the upper piston part and the lower piston part.

It is problematical in this connection that the tensile stress can become so great that when the upper piston part and the lower piston part are screwed together, the threaded bore can widen out as a result of the tensile forces, which are directed vertically upward. As a result, the screw connection is destabilized, in the final analysis. This can go so far that the support plate is deformed or even destroyed, and the screw connection is torn apart.

The task of the present invention consists of making available a piston of this type, in which the upper piston part and the lower piston part are connected with one another by means of a screw connection, in stable manner, whereby the screw connection is not impaired.

The solution consists of a piston having a plate body that is connected with the lower piston part by way of a connection region, in such a manner that the threaded body lies lower, with reference to the longitudinal piston axis, than the lower end of the connection region.

The configuration of the connection of the support plate with the lower piston part, according to the invention, brings about the result that when the upper piston part and the lower piston part are screwed together, the inside thread of the threaded body is moved radially toward the threaded head. As a result, the threaded body is drawn against the threaded head in a type of support or clamping effect, so that the threaded body is supported on the threaded head, and the screw connection is reinforced and additionally stabilized. As a result, the tensile forces that occur in the screw connection are absorbed and passed off by way of the support plate.

Advantageous further developments are evident from the dependent claims.

The threaded body as a whole lies lower, with reference to the longitudinal piston axis, than the connection region by way of which the plate body is connected with the lower piston part. The concrete embodiment depends on the requirements of an individual case. The only essential thing is that the lower end of the threaded body lies lower than the lower end of the connection region, so that the support or clamping effect, as described, will occur.

The threaded body can have either a threaded through-bore provided with the inside thread, or a dead-end bore provided with the inside thread.

A preferred further development provides that the lower piston part has an inner, circumferential support element, and that the support plate is connected with the inner support element. In this manner, the piston can be provided both with an outer and with an inner circumferential cooling channel.

In order to have the upper piston part and the lower piston part support one another in the assembled state, the upper piston part and the lower piston part preferably have inner circumferential support elements with inner contact surfaces, and outer circumferential support elements with outer contact surfaces. In the assembled state, the inner contact surfaces, on the one hand, and the outer contact surfaces, on the other hand, lie against one another, in each instance.

Figure 2:
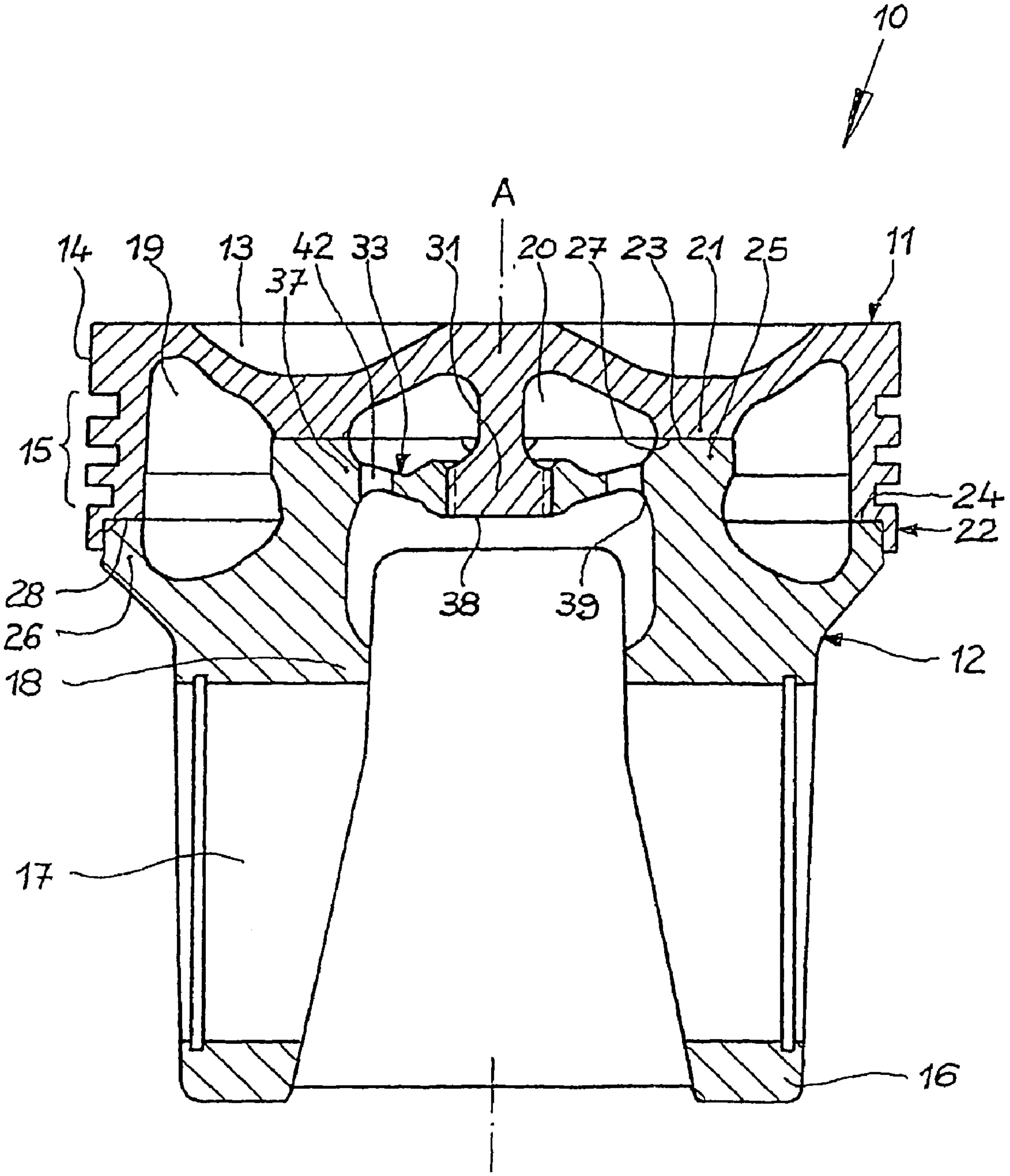

An exemplary embodiment of the invention will be explained in greater detail below, using the attached drawings. These show, in a schematic representation, not to scale:

FIG. 1 a section through an exemplary embodiment of a piston according to the invention;

FIG. 2 a section through the exemplary embodiment of a piston according to the invention according to FIG. 1, rotated by 90° about the longitudinal piston axis.

Figure 3:
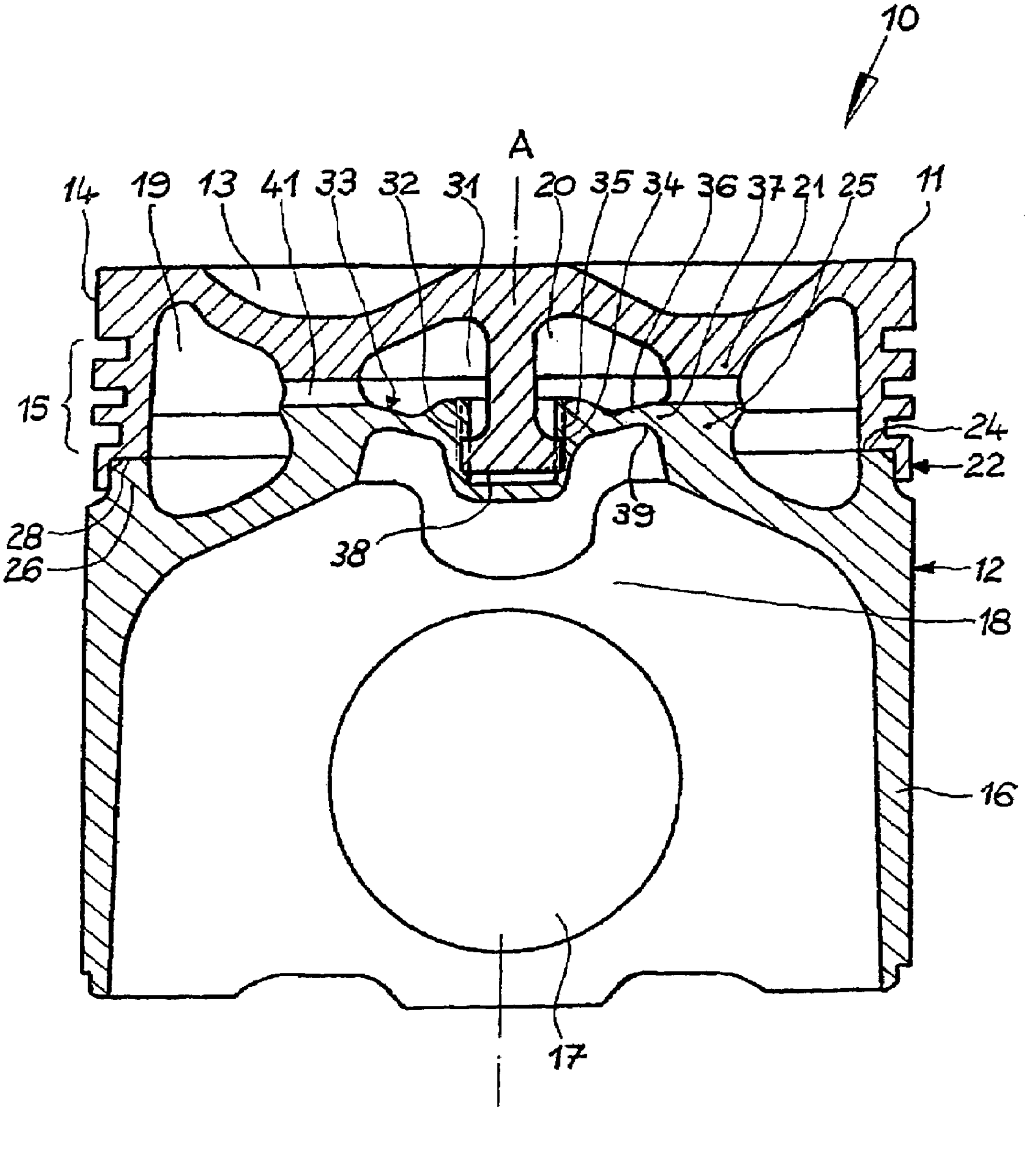

FIG. 3 a section through a further embodiment of a piston according to the invention.

FIGS. 1 and 2 show a section through an exemplary embodiment of a piston 10 according to the invention, whereby the representation in FIG. 2 is rotated by 90° as compared with the representation in FIG. 1.

The piston 10 according to the invention is composed of an upper piston part 11 and a lower piston part 12. The upper piston part 11 has a combustion bowl 13 and a side wall having a circumferential top lane 14 and a circumferential ring belt 15. The lower piston part 12 has a piston skirt 16, pin bosses 17 for accommodating the piston pin (not shown), and pin boss supports 18, which are connected with the piston skirt 16. The upper piston part 11 and the lower piston part 12 form a circumferential outer cooling channel 19 and a circumferential inner cooling channel 20.

The upper piston part 11 has a circumferential inner support element 21 having a circumferential inner contact surface 23, and a circumferential outer support element 22 having a circumferential outer contact surface 24. The lower piston part 12 also has a circumferential inner support element 25 having a circumferential inner contact surface 27, and a circumferential outer support element 26 having a circumferential outer contact surface 28.

In the assembled state, the upper piston part 11 and the lower piston part 12 are oriented with regard to one another in such a manner that the inner contact surface 23 of the inner support element 21 of the upper piston part 11 and the inner contact surface 27 of the inner support element 25 of the lower piston part 12 lie on top of one another. Likewise, the outer contact surface 24 of the outer support element 22 of the upper piston part 11 and the outer contact surface 28 of the outer support element 26 of the lower piston part 12 lie on top of one another. The ring belt 15, including the outer support element 22 that follows it, as well as the inner support element 21 of the upper piston part 11, on the one hand, and the outer support element 26 and the inner support element 25 of the lower piston part 12, on the other hand, form and delimit the circumferential outer cooling channel 19 of the piston 10.

In the exemplary embodiment, a threaded head 31 is formed onto the underside of the upper piston part 11 that faces the lower piston part 12, centered in the longitudinal piston axis A. The threaded head 31 is provided with an outside thread.

The lower piston part 12 is provided with a support plate 33 at its top, which faces the upper piston part 11. The support plate 33 has a threaded body 34 disposed in the center, which body has a threaded bore 35 disposed centered in the longitudinal piston axis A, which bore is provided with an inside thread. The threaded head 31 is screwed into the threaded bore 35 in such a manner that the upper piston part 11 and the lower piston part 12 are firmly connected with one another by means of the resulting screw connection 32, whereby they support one another on their corresponding contact surfaces 23 and 27, and 24 and 28, respectively.

The support plate 33 furthermore has a ring-shaped circumferential plate body 36. In the exemplary embodiment, the plate body 36 is connected with the inside of the inner support element 25 of the lower piston part 12 by way of a defined connection region 37. In this connection, the lower end 38 of the threaded head 31 is disposed below the lower end 39 of the connection region 37, with reference to the longitudinal piston axis A. This arrangement brings about the result that the plate body 36 is drawn slightly upward while the threaded head 31 and the threaded body 34 are screwed together, by the tensile forces caused by the screwing-together process. As a result, the inside thread of the threaded body 34 is moved radially toward the threaded head 31 to a slight degree. Since the plate body 36 is elastic, to a slight degree, because of the material selected and/or the design configuration, particularly its thickness, the threaded body 34 is drawn against the threaded head 31 in a type of support or clamp effect. This brings about the result that the threaded body 34 supports itself on the threaded head 31, and the screw connection is reinforced and additionally stabilized. As a result, the tensile forces that occur in the screw connection are absorbed and passed off by way of the support plate 33.

In a further embodiment shown in FIG. 3, the threaded body 34 is designed as a dead-end hole (blind hole). In this embodiment of the invention shown in FIG. 3, the threaded body 34 as a whole lies lower, with reference to the longitudinal piston axis A, than the lower end 39 of the connection region 37.

The inner support elements 21 and 25, respectively, the support plate 33, and the threaded head 31 form and delimit the circumferential inner cooling channel 20.

In the exemplary embodiment, the inner support element 25 of the lower piston part 12 is provided with overflow channels 41 for coolant, which connect the circumferential outer cooling channel 19 with the inner circumferential cooling channel 20. In the exemplary embodiment, the plate body 36 is provided with run-off openings 42 for cooling. The coolant is supplied to the circumferential outer cooling channel 19 from the outside, as is usual and known to a person skilled in the art. The coolant is transported from the circumferential outer cooling channel 19 into the circumferential inner cooling channel 20 by way of the overflow channels 41, and from there passed out by way of the run-off openings 42.

The invention claimed is:

1. Multi-part piston for an internal combustion engine, having an upper piston part and a lower piston part, whereby the upper piston part has a threaded head provided with an outside thread on its side facing the lower piston part, and the lower piston part has a support plate with a plate body and a threaded body provided with an inside thread on its side facing the upper piston part, into which the threaded head is screwed, wherein the plate body is connected with the lower piston part by way of a connection region, in such a manner that the threaded head as a whole lies lower, with reference to the longitudinal piston axis, than the lower end of the connection region and such that the plate body extends at an angle downwardly from the connecting region to the threaded body.

2. Piston according to claim 1, wherein the threaded body has a threaded through-bore provided with the inside thread.

3. Piston according to claim 1, wherein the threaded body has a dead-end bore provided with the inside thread.

4. Piston according to claim 1, wherein the lower piston part has an inner, circumferential support element, and the support plate is connected with the inner support element.

5. Piston according to claim 1, wherein the upper piston part and the lower piston part have inner circumferential support elements with inner contact surfaces, and outer circumferential support elements with outer contact surfaces, and in the assembled state, the inner contact surfaces and the outer contact surfaces lie against one another, in each instance.

* * * * *